United States Patent

Janu

[15] 3,696,830
[45] Oct. 10, 1972

[54] FLOW CONTROL SYSTEM EMPLOYING A SERIES REFERENCE RESISTOR

[72] Inventor: George J. Janu, Milwaukee, Wis.
[73] Assignee: Johnson Service Company, Milwaukee, Wis.
[22] Filed: March 4, 1971
[21] Appl. No.: 121,038

[52] U.S. Cl. .....................137/209, 137/486, 137/84
[51] Int. Cl. ..............................................F16k 3/385
[58] Field of Search...................137/209, 486, 84, 85

[56] References Cited

UNITED STATES PATENTS

| | | | |
|---|---|---|---|
| 2,604,108 | 7/1952 | Considine | 137/209 X |
| 2,098,914 | 11/1937 | Gorrie | 137/486 |
| 2,714,895 | 8/1955 | Rockwell | 137/487 X |

Primary Examiner—Alan Cohan
Attorney—Andrus, Sceales, Starke & Sawall

[57] ABSTRACT

A reference resistor is connected in a flow line connected to a pressurized bottle. A pair of diaphragm repeaters are connected one to each side of the resistor. Each repeater includes a flow chamber in series with the line and having a diaphragm common to an output chamber having a bleed orifice, responsive to the position of the diaphragm. A diaphragm controller has opposite sides of a diaphragm subjected to the outputs of the fluid repeaters and controls a nozzle connected to an air supply and a repeater the output of which connects the air supply to the bottle.

11 Claims, 4 Drawing Figures

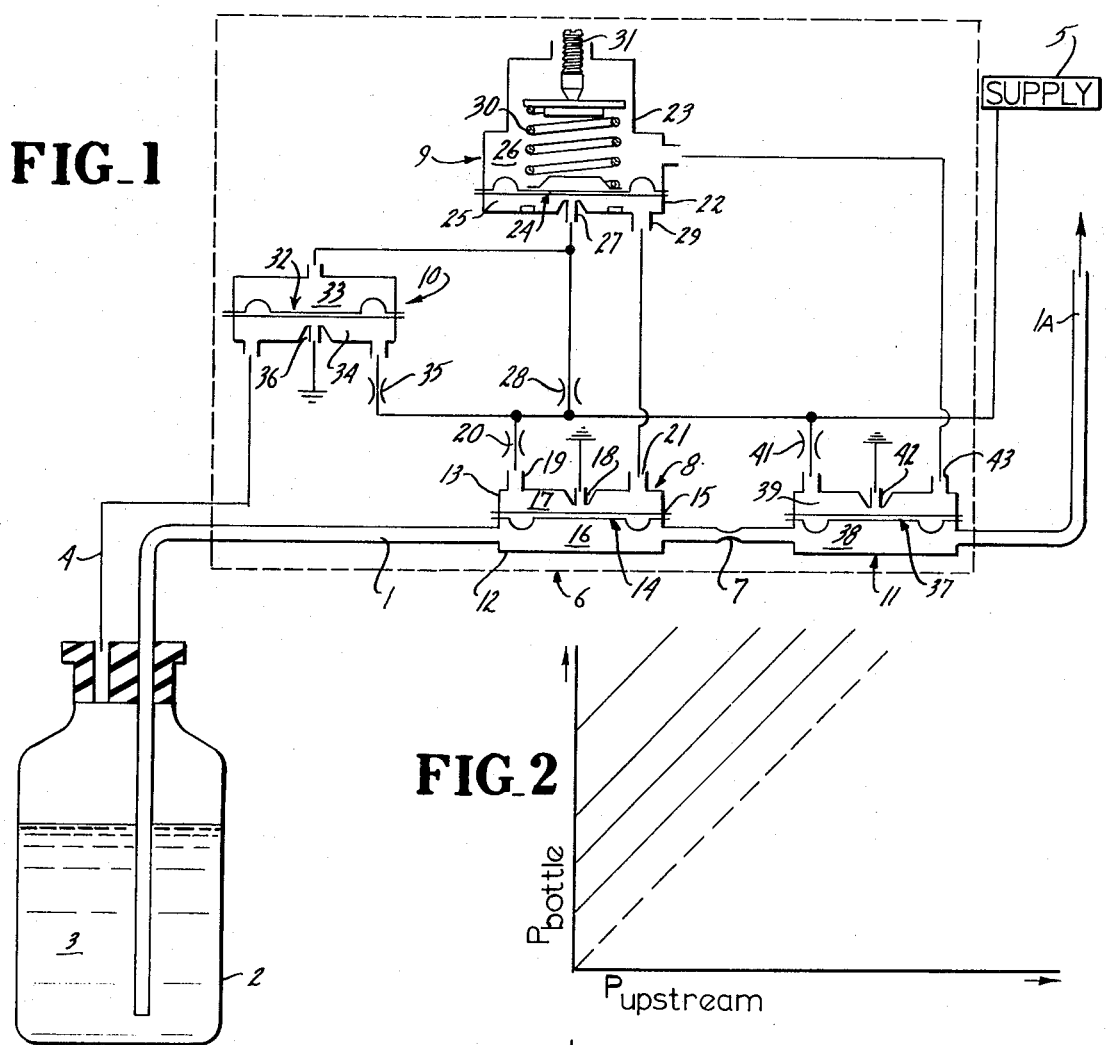
FIG_1
FIG_2
FIG_4
FIG_3
INVENTOR.
GEORGE J. JANU
BY
Andrus, Sceales, Starke & Sawall
Attorneys

FLOW CONTROL SYSTEM EMPLOYING A SERIES REFERENCE RESISTOR

BACKGROUND OF THE INVENTION

This invention relates to a flow control system employing a reference resistor means connected serially in the flow line and coupled to a control loop to establish a reliable and accurate control of flow through the system particularly where relatively low flows are encountered.

In many applications a precise liquid flow rate is desired. Various systems may be provided to sense the flow and through adjustment of the flow system establish and maintain a preselected constant flow. Thus, a reference restrictor may be provided which is serially connected in the flow line. The pressure drop across the flow reference restrictor is directly proportional to the flow. A flow restriction valve in the flow line can be adjusted to vary the flow and maintain a constant flow through the reference resistor. The valve, for example, may be connected upstream of the resistor and coupled to a diaphragm for automatic positioning of the flow restriction valve in accordance with the pressure differential across the reference resistor. Thus, the diaphragm may define a chamber forming a part of the valve passageway serially connected in the flow line. The upstream pressure is thus applied directly to the corresponding side of the diaphragm. The downstream pressure is connected to a opposing diaphragm chamber which tends to balance that of the upstream pressure. In addition, an adjustable compression spring is provided in the diaphragm chamber which is added to the downstream force. The diaphragm and, consequently, the interconnected valve stem assumes a position to establish a force balance between the opposite forces exerted on the diaphragm. Assuming that the discharge side of the reference resistor is connected to atmosphere, the diaphragm will assume a position such that the upstream pressure will balance that of the force of the compression spring. This, in essence, will provide for maintaining of the upstream pressure constant and proportional to the spring load. If the downstream pressure should increase for any reason above atmosphere, for example, due to additional flow restriction in the output line, a corresponding pressure signal is created in the diaphragm chamber which is added to the spring load. This will reposition the valve restrictor to cause an equal increase in the pressure to the upstream side of the reference resistor and thereby maintain a constant pressure difference across the flow or reference resistor. This, in turn, will maintain the desired constant flow in the system. In such a system the supply pressure of the incoming liquid must of course be higher than the highest expected upstream pressure requirement in the upstream chamber of the valve controller. The pressure can be provided as a hydrostatic pressure by locating of a liquid storage means sufficiently above the level of the controller, by a pump or more conventionally by a pressurized container such as an airtight storage tank which is pressurized from a suitable air source. The hydrostatic pressure must be compensated for if there is any significant change in the level of the storage tank or the discharge line relative to the controller.

Although such a controller can provide reasonably accurate flow control, the valve components must be precisely constructed, particularly for systems having relatively low flow rates. Further, the system includes mechanically moving parts which are immersed within the liquid. This not only makes it difficult to clean the controller by the use of flow-through wash liquids but subjects the controller to possible attack by the controlled liquid as well as possibly providing a source of contamination to the liquid. For example, in medical applications highly aggressive reagents are often encountered which must be metered at a very accurate flow rate and very often at relatively low flows. For example, it is not unusual to require metering of a reagent at a rate of 13.5 milliliters per minute at an adjusted upstream pressure of approximately 6 pounds per square inch. In such applications prior art controllers have not been found to provide the desired reliability and accuracy of flow control and have, of course, presented the problems of contamination and difficulty in cleaning.

SUMMARY OF THE PRESENT INVENTION

The present invention is particularly directed to a fluid controller employing a single flow restriction in the flow system to establish and maintain precise control of relatively low flow rates. The teaching of the present invention permits elimination of the immersion of the mechanical parts in the main flow system and permits reliable cleaning by the flow-through of wash liquids.

Generally, in accordance with the present invention, a reference flow resistor means is connected in the flow line means which includes a controlled pressurized source of the main liquid. The diaphragm repeater includes a flow chamber connected in series with the flow line means and having one wall of the chamber defined by a diaphragm. An output pressure signal is responsive to the position of the diaphragm which position corresponds to the static pressure of the liquid in the flow line. A controller is actuated by the output of the fluid repeater and an opposing pressure corresponding to the desired pressure difference over the reference resistor plus the pressure downstream of the resistor. The output of the controller actuates the pressurized flow source to maintain a constant pressure difference across the resistor and therefore a constant flow in the resistor and the flow line. The flow control system thus includes the single restriction established by the reference resistor and permits accurate control of the flow rate with known and commercially available components.

In a preferred construction, a fluid repeater is connected to the downstream side of the reference resistor and provides a pressure signal related to the downstream pressure. The downstream pressure signal of the repeater is added to the set point pressure, compared to the upstream pressure and interconnected to the flow source to maintain the constant pressure difference across the reference resistor and thereby maintain the constant flow. With the dual repeater, there are no mechanical parts immersed within the flowing liquid and the only parts subjected to the liquid are the pressure sensing diaphragms. These may readily present a continuous surface within the flow chambers so as to permit them to be readily cleaned by a washthrough cleaning liquid and thus eliminate one of the disadvantages associated with pressure reducing valves and the like.

The pressure repeaters may advantageously be pneumatic output units of the common bleed-off variety where the position of the diaphragm restricts the air flow through a bleed nozzle connected to a reference. A supply pressure is connected to the nozzle chamber and the nozzle chamber pressures are directly proportional to the positioning of the diaphragm. The diaphragm thus isolates the mediums while accurately providing a pressure signal related to that of the sensed pressure of the flowing liquid. The pressure repeaters can be connected into a suitable closed loop pneumatic flow control system.

In accordance with a particularly novel, useful and practical application of the present invention, the repeaters to the opposite sides of the reference resistor are so constructed. The upstream pressure repeater has the nozzle or output chamber connected to a diaphragm pressure controller. The pressure controller employs a diaphragm which is biased as by a spring or other adjustably fixed load to close a nozzle. The nozzle is connected to a pneumatic supply through a suitable supply restrictor and as the input to a pressure repeater. The pressure repeater in turn has its output connected to control pressure level of a pressurized main liquid source container or tank for the main liquid. This provides an inner loop to maintain the upstream pressure at a selected level. An out or downstream loop is superimposed on the upstream loop to reflect any variations in the downstream pressure from atmosphere or reference. Thus, the downstream repeater has its output connected to the spring chamber of the pressure controller. If the downstream pressure increases the signal is applied to the pressure controller and, in effect, adds to the spring load. This effectively increases the set point which is coupled to the first loop and thereby results in an increase in the upstream pressure which is sensed by the upstream repeater. The pressure will increase until a new force balance condition is established with the pressure differential across the reference resistor corresponding to the previous pressure difference. Thus, any increase in the downstream back pressure results in an equal increase in the upstream pressure by increasing the pressure in the storage tank so that the pressure difference across the reference resistor is constant. With a constant pressure difference across the resistor, a corresponding constant flow is necessarily maintained.

The system is relatively insensitive to variations in the relative position of the storage tank and the controller because the upstream pressure deviation depends upon the gain of the pressure difference controller while the change in the pressure in the storage tank is equal to the change of the hydrostatic pressure.

The present invention has been found to provide a sensitive and reliable flow controller for maintaining precise flow rates at relatively low flows. The elimination of the immersion of mechanical parts within the liquid permits relatively easy wash flow cleaning or flow through cleaning of the apparatus and minimizes the danger of contamination of the liquid and thus particularly adapts the flow controller to medical applications and the like where such factors are of considerable significance.

BRIEF DESCRIPTION OF THE DRAWING

The drawing furnished herewith illustrates the best mode presently contemplated by the inventor for carrying out the invention in which the above advantages and features are clearly disclosed as well as others which will be readily understood from the following description.

In the drawing:

FIG. 1 is a schematic or diagrammatic illustration of a flow system including a flow controller constructed in accordance with the present invention;

FIG. 2 is a graphical illustration of the bottle pressure versus upstream pressure characteristics of the system for various bottle elevations;

FIG. 3 is a graphical illustration of the output pressure versus the input pressure of the pressure controller of FIG. 1; and FIG. 4 is a graphical illustration combining the curve of FIGS. 2 and 3, for various bottle elevations and various controller set points; the intersecting points representing steady state conditions of the inner loop of FIG. 1.

DESCRIPTION OF THE ILLUSTRATED EMBODIMENT

Referring to the drawing and particularly to FIG. 1 the present invention is shown applied to maintain a constant flow in a line 1 the input end of which is connected to a pressurized storage bottle or tank 2 for holding of a liquid 3 under an adjustable pressure head as established by a pressure line 4 connected to the storage tank 2 and to a suitable fluid pressure source 5 which may conveniently be air. The liquid may be any suitable liquid such as, for example, an aggressive reagent employed in medical applications and the like. In such application the flow system is preferably constructed to permit ready cleaning of the line and associated apparatus by flow-through of a suitable cleaning liquid. The line 1 may terminate in atmosphere such that the discharge or downstream end of the line 1 is normally at atmospheric pressure, but may also be at different levels and connected to flow restricting devices. A flow controller 6 constructed in accordance with the present invention is connected in the flow line 1 and in the air pressurizing line 4. The flow controller 6 is operable to vary the pressure supplied to the storage bottle 2 to maintain a constant flow through and from line 1.

Generally, the flow controller 6 includes a reference resistor 7 connected in series in the flow line 1 and shown as a restriction in the flow line 1. A diaphragm type fluid repeater 8 is connected upstream of the reference resistor 7 and establishes an output pressure signal corresponding to the upstream pressure. This pressure signal is applied to a pressure controller 9 the output of which is connected through a fluid repeater 10 in the illustrated embodiment of the invention to vary the connection of the air supply 5 to the air line 4 and to thereby vary the pressurization of the storage tank 2. The pressure controller 9 determines the set point and thus determines the upstream pressure to be established.

A fluid pressure repeater 11 is connected into line 1 downstream of the reference resistor 7 and provides an output signal to the pressure controller 9 and resets the set point of the controller accordingly. This will result in a corresponding increase in the upstream pressure as a result of an increased pressurization of the air line 4 and thus resets the upstream pressure to maintain a constant pressure differential across the reference resistor 7. As long as the pressure drop across the reference resistor 7 is maintained constant, the flow through the resistor 7 and thus through the line 1 is maintained constant.

More particularly, the diaphragm sensing repeater 8 is shown in accordance with the teaching of the co-pending application of Urban A. Weber and George J. Janu for "BLEED TYPE FLUID PRESSURE CONTROL APPARATUS AND DIAPHRAGM THEREFOR," and includes a two piece housing including opposed sections 12 and 13 with an intermediate convoluted diaphragm wall 14 clamped between the housing sections as at 15. The wall 14 divides the housing into a main flow chamber 16 and a nozzle or orifice chamber 17. The chamber 16 is connected in series in line 1 between the tank 2 and the upstream side of the reference resistor 7. Thus, the corresponding side of the convoluted diaphragm 14 is subjected to the upstream pressure.

The opposite member 13 includes a nozzle 18 centrally aligned with the adjacent face of the convoluted diaphragm 14. The nozzle 18 is connected to reference which may be the atmosphere for the pneumatic system. The nozzle or orifice chamber 17 further includes an input port 19 connected to the air supply 5 through a related pressure dropping restrictor 20. The pressure in the orifice chamber 17 is directly controlled by the relative positioning of the diaphragm 14 relative to the orifice of nozzle 18. Thus, with the diaphragm 14 spaced from the nozzle 18 to permit relatively unrestricted flow therethrough, the pressure in the chamber 17 will be atmospheric pressure. As the diaphragm 14 moves towards the nozzle 18, the flow is restricted and the pressure within the chamber 17 will increase. In the limit, the diaphragm 14 will close the nozzle 18 and the pressure in chamber 17 will build to the supply pressure. In the illustrated embodiment of the invention, a separate output port 21 connects the chamber 17 as an input signal to the pressure controller 9 which is connected through the repeater 10 to vary the pressures at line 4. The port 19 may, of course, be connected directly to controller 9 as it is at the pressure as chamber 17.

The pressure controller 9 is illustrated as a diaphragm unit which preferably is constructed in accordance with the teaching of the previously identified co-pending application. Generally, controller 9 includes a two piece house 22 and 23 with an intermediate convoluted diaphragm 24 defining a nozzle and orifice chamber 25 and a reference and signal chamber 26. The housing section 22 includes a nozzle 27 aligned concentrically with the diaphragm 24. The nozzle 27 is connected to the air supply 5 through a related supply pressure dropping restrictor 28. The nozzle 27 is also connected as an input to the pressure repeater 10 to correspondingly drive the air line 4. The nozzle and orifice chamber 25 of the pressure controller 9 includes an input port 29 connected to the output port 21 of the pressure repeater 8. With the nozzle 27 closed by the diaphragm 24, the pressure input to repeater 10 will correspond to the supply pressure supplied by the dropping restrictor 28. As the input signal pressure rises, it will force the diaphragm 24 from the nozzle 27 and the output pressure will drop (FIG. 3) to the level of the signal pressure from the pressure sensing repeater 8. Any further increase in input pressure at 29 is directly repeated at the output of controller 9. This change in output pressure will thus be transmitted to the pressure repeater 10 to correspondingly control the pressure at line 4.

The diaphragm 24 is normally biased to close the nozzle 27 by a compression spring 30 concentrically mounted within the chamber 26. An adjusting or set point screw 31 permits varying of the compression of the spring 30 to thereby adjust the force required to overcome the spring pressure and move the diaphragm from the nozzle 27. Thus the diaphragm 24 is balanced by the spring force 30 and the force established in chamber 25 by the signal from the pressure sensing pressure repeater 8. The output of pressure controller 9 is supplied to the pressure repeater 10.

The pressure repeater 10 is similar to the repeater 8 and provides a one-to-one gain to establish a corresponding pressure at line 4. The pressure repeater 10 decreases the time response of the inner loop by providing flow amplification. If the more rapid response is not required, the repeater 10 may, of course, be eliminated.

The illustrated repeater 10 generally includes an inner convoluted diaphragm 32 defining an input chamber 33 connected to the nozzle 27. The diaphragm 32 further defines a nozzle and orifice chamber 34 connected via a supply restrictor 35 to the air supply 5. A nozzle 36 exhausts the chamber 34 to the atmosphere. The diaphragm 32 therefore assumes a force balance overlying the nozzle 36 to maintain the pressure in the chamber 34 equal to the input pressure established in chamber 33. The line 4 is connected to the chamber 34 and thus is held at a corresponding pressure.

Pressurized bottle 2, upstream repeater 8, pressure controller 9 and repeater 10 thus provide an inner set point loop with the pressure at the line 4 continuously modulated or adjusted to maintain a predetermined upstream pressure to the upstream side of the reference resistor 7. This inner loop is further modified by an outer or set point control loop which includes the downstream pressure repeater 11.

The repeater 11 is constructed in the same manner as the repeater 8 and 10, in the illustrated embodiment of the invention. Thus, the repeater 11 includes a convoluted diaphragm 37 defining a main flow chamber 38 connected in series in the discharge end of line 1. The chamber 38 is thus normally at atmospheric or discharge pressure. The convoluted diaphragm 37 further defines a nozzle and orifice chamber 39 connected via a supply restrictor 41 to the air supply 5. A nozzle 42 vents the chamber 39 to ground or atmosphere. An output port 43 connectes the chamber 39 to the spring chamber 26 of the pressure controller 9. The chamber 38 is at the downstream pressure which is normally atmospheric. The diaphragm 37 is then spaced from the nozzle 42 to freely vent or exhaust the chamber 39 to the atmosphere. As a result, the signal transmitted by the port 43 to the chamber 26 will be reference pressure and the only forces acting on the pressure controller 9 will be the load of the set point spring 30 and the signal from the upstream sensing pressure repeater 8.

If the downstream pressure should increase above the atmospheric pressure level due to any cause such as additional flow restriction downstream of the reference resistor 7 or an increase in the hydrostatic back pressure in the downstream line as a result of the raising of the end 1A of the downstream line significantly above the level of the repeater 11, a corresponding increase in pressure will be established in the flow chamber 38. This will move the diaphragm 37 toward the nozzle 42 until such time as the pressure in the output chamber 39 rises to the level of the flow pressure and thereby reestablishes the necessary force balance upon the convoluted diaphragm 37. The increase in pressure is transmitted via the port 43 to the set point chamber 26 of the pressure controller 9. The increased pressure signal is summated or added to the spring load on the diaphragm 24. This requires a higher pressure in chamber 25 to move the diaphragm 24 from the nozzle 27 and thus increases the set point of the inner loop of the system. This is shown by the broken line curve in FIG. 3. The increasing of the set point will increase the pressure within the storage bottle 2 which, in turn, will be reflected in an increased upstream pressure at chamber 16 of the repeater 8. In this manner, any increase in pressure to the downstream side of the reference resistor 7 establishes an equal increase in the upstream pressure to the upstream side of the reference resistor 7. As a result the pressure difference across the reference resistor 7 is held at a constant value determined by the positioning of the set point screw 31. With the constant pressure difference a constant flow is accurately maintained.

The subject flow controller 9 is able to maintain a constant flow through the reference resistor based on a relationship of a constant pressure difference across a flow sensing resistor. Changes in temperature and/or viscosity of the liquid would, of course, result in a flow deviation. If the use introduces such deviation or variation, the flow controller 6 can of course be placed in a regulated environment such as a temperature controlled environment.

The operation of the controller is graphically illustrated in FIGS. 2 – 4.

In FIG. 2, the bottle or tank pressure versus the upstream pressure is shown by a series of straight parallel lines. The broken line curve going through the zero intercept corresponds to a liquid level in the bottle 2 at the same level as the controller 6 and particularly the repeater 8. As the liquid level rises above or drops below the repeater, the hydrostatic pressure varies the characteristic to include a related offset. Thus, with the bottle below the level of the repeater 8, the hydrostatic pressure (due to the height of the liquid in line 1 above the liquid level in bottle 2) is subtracted from the bottle pressure to establish a related pressure in the chamber 16 of the repeater 8.

As previously described, FIG. 3 illustrates two curves for different set point settings of controller 9.

In a steady state condition, the overall characteristics are determined by the intersection of the characteristics shown in FIGS. 2 and 3, as shown in FIG. 4. The actual upstream pressure deviation for a change in the hydrostatic pressure (due to change in elevation of bottle 2) is shown by the horizontal displacement of the intercept of the pressure controller set point characteristic curves of FIG. 3 with respect to the bottle pressure versus upstream pressure characteristic curves of FIG. 2. By operating of the system on the relatively straight line or high gain portion of the pressure controller set point characteristic curves of FIG. 3, the actual deviation is shown to be very minimal, for example, as shown by the displacement between the intermediate intercept points and this is true because the deviation is controlled by the gain of the pressure controller 9 which can be readily adjusted to have a gain of 10 or 20, or higher. The present invention is thus applicable to systems wherein the storage tank or bottle 2 is below the level of the reference resistor 7. This ensures working on the relatively linear and high gain portion of the controller characteristic. In addition, should the level of the liquid in bottle 2 be at or above the elevation of diaphragm 14, there are no points of intersection of the characteristic curves of FIGS. 2 and 3 indicating an unstable inner feedback loop. It should be noted that the discharge end 1A of the system line must be at or above diaphragm 37 of repeater 11 for proper operation, since repeater 11 can transmit only pressures higher than atmospheric pressures.

An increase downstream pressure, for example, arising from a restriction is equivalent to an increase in the force of the spring 30. It thus merely moves the set point to a higher pressure level similar to the dotted line characteristic associated with an increase in spring pressure. The increase in the upstream pressure is identical to the initiating downstream pressure increase, such that the pressure difference is constant and the resulting flow is also constant.

The present invention thus provides a closed loop pressure sensitive control system for maintaining constant liquid flow through a flow line.

The downstream pressure repeater essentially serves only as a means for separating the main flowing liquid 3 in line 1 from the control fluid in the loop. This prevents the possible contamination of the liquid as well as minimizing the attack upon the working parts of the flow controller. Where the isolation in not considered essential the downstream side of the fluid reference resistor can be connected directly to the dead-ended chamber 26 of the pressure controller.

Similarly, the coupling pressure repeater 10 as previously noted is inserted in the circuit to provide flow amplification and thereby improve the time response of the loop. If the improved time response characteristic is not required the output pressure of the controller can of course be employed to directly pressurize the bottle or other control.

Generally, however, for medical applications and the like where maximum separation of the main flow which may generally be an aggressive reagent from the control circuit is desired and where contamination and response limitations are substantial the multiple repeater control system such as shown in FIG. 1 provides optimum results.

In the construction of a system such as shown in FIG. 1, a reference resistor having an 0.007 inch diameter orifice was connected in a flow line for carrying water at approximately 13.5 milliliters per minute. The main air supply provided 20 pounds per square inch pressure and the overall system was established to provide an adjusted upstream pressure of approximaterly 6 pounds per square inch. The pressure repeaters 8, 10 and 11 and the controller 9 were constructed with a convoluted diaphragm construction of approximately 0.775 inches diameter. The pressure controller 9 had a high gain portion of the characteristic of approximately 10 to 15 gain. The water level was displaced approximately 3 feet from the level of the repeaters and thus introduced a 36 inch water gauge increase in the upstream repeater pressure offset. The maximum upstream pressure deviation with such a change was approximately two inches water gauge which represented an approximate 0.8 percent change in the flow. The percentage deviation of the flow is proportional to the square root of the upstream pressures ratio at the limits of the three foot displacement in the position of tank 2. The mentioned accuracy of the flow control may be improved by increasing the gain of the functional portion of the pressure controller's 9 characteristics.

The present invention as shown and described can employ relatively standard commercially obtainable components such as diaphragm amplifiers, bleed-off type pressure repeaters and accurately formed reference resistors. Further, the only restriction in the system is the reference resistor which permits maximum efficiency and a substantially improved overall reliability and repeatability in the operating characteristic. With the upstream and downstream repeaters as illustrated, complete isolation is established between the main flowing liquid and the control system.

The present invention thus provides a simple and reliable flow controller, particularly for control of low flows and liquids which should be isolated from the control system while permitting convenient and rapid flow-through cleaning.

Various modes of carrying out the invention are contemplated as being within the scope of the following claims, particularly pointing out and distinctly claiming the subject matter which is regarded as the invention.

I claim:

1. A flow control system for maintaining a selected constant flow rate from a pressurized storage tank by establishing a constant pressure difference across a reference flow resistor means serially connected in a flow system comprising, a diaphragm repeater means connected in series with said resistor means to one side of said resistor means and establishing a pressure signal proportional to the pressure in the flow system, means connected in series with said resistor means to the opposite side of the resistor means and establishing a pressure signal proportional to the pressure in the flow system, and a pressure responsive means to compare said pressure signals and vary the pressure in said storage tank to maintain a constant flow through said resistor means.

2. A flow control system for maintaining a selected constant flow rate from a pressurized storage tank, comprising an adjustable pressure source for establishing liquid flow under a preselected pressure range, a reference flow resistor means connected to said source and establishing a pressure drop proportional to flow, a first diaphragm repeater means having a diaphragm sensing chamber connected in series with said resistor means to the upstream side of the resistor and establishing a pressure signal proportional to the upstream pressure, downstream pressure sensing means connected to the downstream side of said resistor means to establish a pressure signal proportional to the downstream pressure, and a pressure responsive means to compare said pressure signals and connected to said source to vary the pressure in the storage tank to maintain a constant flow through said resistor means.

3. The flow control system of claim 2 wherein said downstream pressure sensing means includes a second diaphragm repeater means having a diaphragm sensing chamber connected in series with said line to the downstream side of the resistor.

4. The flow control system of claim 2 wherein said pressure responsive means includes a diaphragm pressure controller having a controlled chamber connected to said first fluid diaphragm repeater and to said adjustable pressure source and a control chamber connected to said downstream pressure sensing means, said controller having a diaphragm common to both of said chambers and positioned by the force balance on the opposite sides thereof and a set point means coupled to said controller diaphragm to establish an initial bias position of said diaphragm.

5. The flow control system of claim 4 including a fluid repeater means connected between said controller and said pressure source to provide flow amplification and thereby quick response to a change in the controller's output pressure.

6. The flow control system of claim 2 wherein said downstream pressure sensing means includes a second diaphragm repeater means having a diaphragm sensing chamber connected in series with the downstream side of said resistor means to establish a pressure signal proportional to the downstream pressure, and said pressure responsive means includes a diaphragm pressure controller having a controlled chamber coupled to said first diaphragm repeater and to said adjustable pressure source and a control chamber coupled to said second diaphragm repeater, a diaphragm common to both of said chambers with the position of said diaphragm establishing the pressure in said controlled chamber and controlling the source in accordance with said pressure.

7. The flow control system of claim 6 including a fluid repeater means connected between said adjustable pressure source and said controlled chamber to provide flow amplification and thereby the response to a change in the controller's output pressure.

8. A flow control system for establishing and maintaining a preselected constant flow, comprising a storage means, a pressurized fluid source coupled to pressurize said liquid storage means, a flow line means connected to said storage means, a flow reference means serially connected in said flow line means, a first diaphragm repeater having an input chamber serially connected in said flow line means between said pressurized source and said reference means and having a control chamber connected to said source and including a bleed nozzle, said repeater having a diaphragm wall common to said chambers and controlling the flow from said nozzle by the position of said diaphragm wall, a diaphragm pressure controller having a controlled pressure chamber coupled to said control chamber said controlled pressure chamber including a nozzle connected to said source and to said storage means to adjust the pressure in said storage means and the flow in said line, said controller having a control chamber separated from the controlled chamber by a common diaphragm wall overlying said nozzle, a resilient means connected to said common diaphragm wall and urging the wall to close said nozzle, and pressure sensing means connected in said flow line means downstream of said flow reference means, and coupled to said control chamber.

9. The flow control system of claim 8 wherein said pressure sensing means is a second diaphragm repeater having an input chamber serially connected in said flow line means downstream of said reference means and having a control chamber including a nozzle connected to said source, said second repeater having a diaphragm wall common to said chambers and overlying said corresponding nozzle to control, by the position of said wall, the flow through said nozzle, said control chamber being connected to said control chamber of said pressure controller.

10. The flow control system of claim 8 having an output repeater with a control chamber connected to the nozzle of said controller and an output chamber connected to said source and to said storage means, a diaphragm common to said chambers, and a bleed nozzle in said output chamber.

11. The flow control system of claim 8 wherein said flow reference means is a resistor, said pressure sensing means is a second diaphragm repeater having an input chamber serially connected in said flow line means downstream of said reference means and having a control chamber connected to fluid source, said repeater having a diaphragm wall common to said chambers and a bleed nozzle in said control chamber with the nozzle opening controlled by the position of said wall, an output diaphragm repeater having a control chamber connected to said storage means and said fluid source, a bleed nozzle in said control chamber, said output repeater having a diaphragm overlying said nozzle and a control connected to the nozzle of said pressure controller.

* * * * *